T 860,006

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 18, 1969

860 O.G. 678

626,787
THERMOPLASTIC POLYMERIC TEAR STRIPS FOR PACKAGING MATERIALS

Marion O. Brunson and William D. McGillen, both of P.O. Box 511, Kingsport, Tenn. 37662

Filed Mar. 29, 1967. Published Mar. 18, 1969
Class 229—51
1 Sheet Drawing. 9 Pages Specification

The method for incorporating a tear strip onto the surface of packaging material such as paperboard, cellophane, or the like, comprising the step of applying a narrow strip of a molten thermoplastic polymer directly to

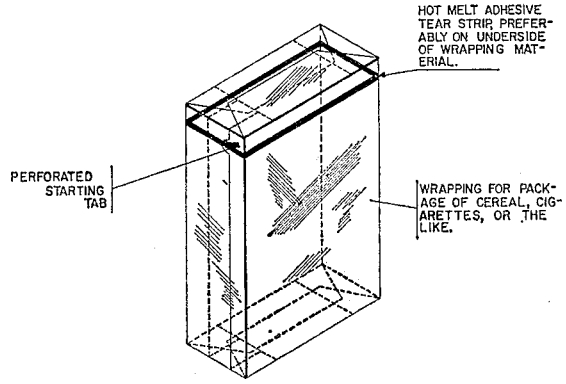

the surface of the packaging material. Polyolefin copolymers are especially useful which have a viscosity of 20,000 to 50,000 cps. at 190° C., e.g., copolymer of 30–60% butene-1 and 40–70% propylene.

T 860,006
March 18, 1969
M. O. BRUNSON ETAL
THERMOPLASTIC POLYMERIC TEAR STRIPS
FOR PACKAGING MATERIALS
Filed March 29, 1967
DEF. PUB.
SN - 626787
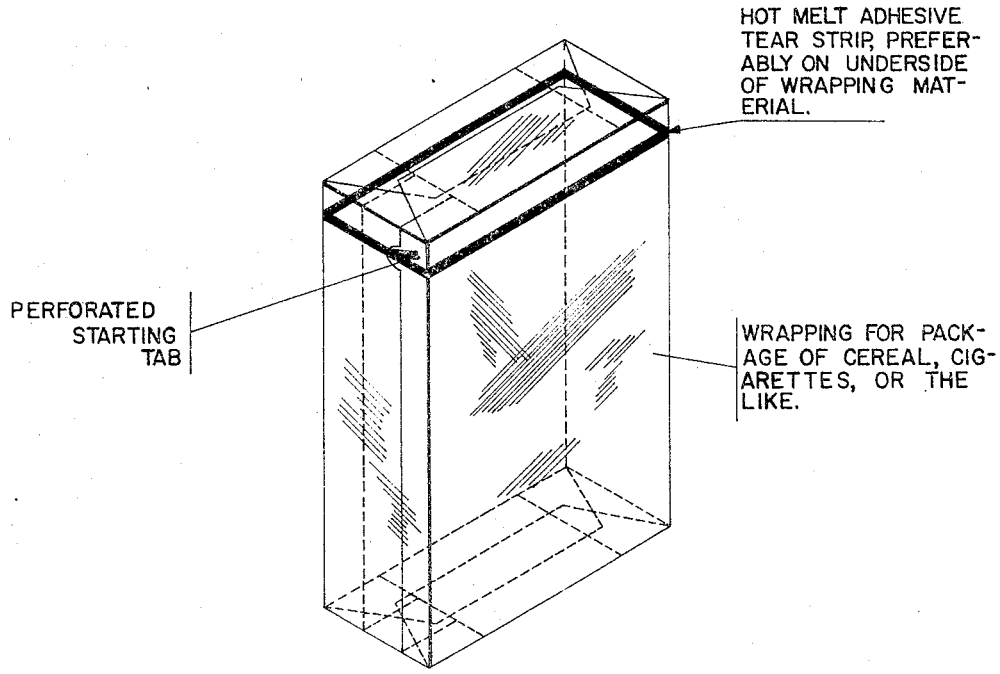
Marion O. Brunson
William D. McGillen
*INVENTORS*
BY William J. French
Charles L. Good
ATTORNEYS